Patented Jan. 13, 1931

1,788,529

UNITED STATES PATENT OFFICE

FRANZ KOENIGSBERGER, OF NEWARK, NEW JERSEY, ASSIGNOR TO DEHLS & STEIN, OF NEWARK, NEW JERSEY

TERTIARY BUTYL NAPHTHOL AND PROCESS FOR MAKING

No Drawing.    Application filed October 22, 1928.    Serial No. 314,332.

Through the interaction of tertiary butyl chloride and naphthol I have made a substance which may be chemically described as tertiary butyl naphthol. To the best of my knowledge this substance has never been made before, and is therefore entirely new. I have found that the substance is useful as a plasticizer for cellulosic compounds, as a dyestuff component and as a pharmaceutical chemical.

A suitable method of preparing my new chemical substance is as follows: Mix together 144 grams beta naphthol, 14 grams aluminum chloride, and 100 grams tertiary butyl chloride at room temperature. Warm the mixture gently in a vessel equipped with reflux condenser until evolution of hydrochloric acid gas ceases. Boil up the melted mass twice with water, each time pouring off the water. The resulting substance is subjected to a vacuum distillation in order to obtain the purified product which I term 4-tertiary-butyl-β-naphthol and which has a boiling point of about 146 degrees centigrade at 8 millimeters pressure. Its melting point I have determined to be about 102 degrees centigrade.

It will of course be readily understood that tertiary butyl naphthol may be made in other ways than that above described. For instance, other butyl halides may be used or alpha naphthol may be used instead of beta naphthol or the given proportions may be varied or other catalysts than aluminum chloride may be employed which are capable of effecting the Friedel and Crafts reaction, such as zinc chloride, ferrous chloride, ferric chloride, stannic chloride and antimony pentachloride.

I have found that a chlorinated derivative of tertiary butyl naphthol is readily made through the interaction of tertiary butyl naphthol and sulfuryl chloride. To make this substance, add sulfuryl chloride drop by drop to a warmed quantity of tertiary butyl naphthol until the evolution of hydrochloric acid gas ceases. Boil up the mass twice with water and throw off the water. Subject the resulting product to a vacuum distillation to obtain pure tertiary butyl naphthol chloride. The number and position of the chlorine atoms entering the nucleus has not been definitely ascertained but it can be safely said that one chlorine atom enters the 1-position. Similarly, other halogenated derivatives of tertiary butyl naphthol may be prepared. These derived substances are to the best of my knowledge also new and they are useful for purposes similar to those mentioned for tertiary butyl naphthol.

I claim:

1. As a new article of manufacture, a substance of the class consisting of tertiary butyl naphthol and its halogenated derivatives.

2. As a new article of manufacture, a chemical substance comprising the reaction product of a butyl halide and a naphthol.

3. As a new article of manufacture, a 4-tertiary-butyl-β-naphthol.

4. As a new article of manufacture, a halogenated derivative of tertiary butyl naphthol.

5. The herein described process of manufacturing a tertiary butyl naphthol which comprises reacting a butyl halide with a naphthol in the presence of a catalyst capable of effecting the Friedel and Crafts reaction.

6. The herein described process of manufacturing a tertiary butyl naphthol which comprises reacting a tertiary butyl chloride with a naphthol in the presence of a catalyst capable of effecting the Friedel and Crafts reaction.

7. The herein described process of manufacing a tertiary butyl naphthol which comprises reacting a tertiary butyl chloride with beta naphthol in the presence of a catalyst capable of effecting the Friedel and Crafts reaction.

8. The herein described process of manufacturing a tertiary butyl naphthol which comprises mixing together beta naphthol, aluminum chloride and tertiary butyl chloride at room temperature, subjecting the mixture to heat until evolution of hydrochloric acid gas ceases, boiling the mass with water and decanting the water and thereupon subjecting the resulting substance to vacuum distillation.

9. The herein described process of manufacturing a chlorinated derivative of tertiary butyl chloride, which comprises reacting tertiary butyl naphthol and sulfuryl chloride.

10. The herein described process of manufacturing a tertiary butyl naphthol which comprises reacting a butyl halide with a naphthol.

11. The herein described process of manufacturing a tertiary butyl naphthol which comprises reacting a tertiary butyl chloride with a naphthol.

In testimony whereof I have affixed my signature.

FRANZ KOENIGSBERGER.